Aug. 23, 1949.    C. F. SIEVERS    2,479,785
PLUG FASTENER ASSEMBLY FOR
LIQUEFIED GAS CYLINDERS
Filed April 22, 1946
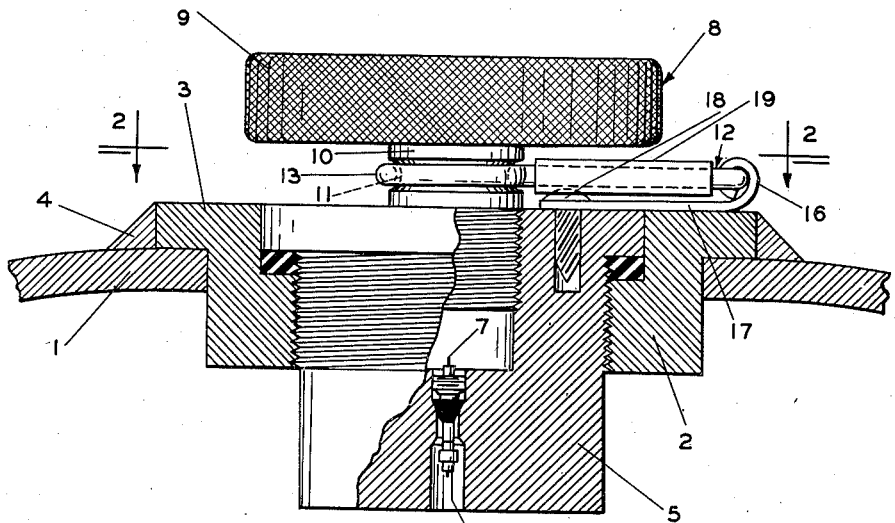
FIG. 1
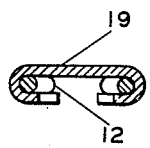
FIG. 4
FIG. 3
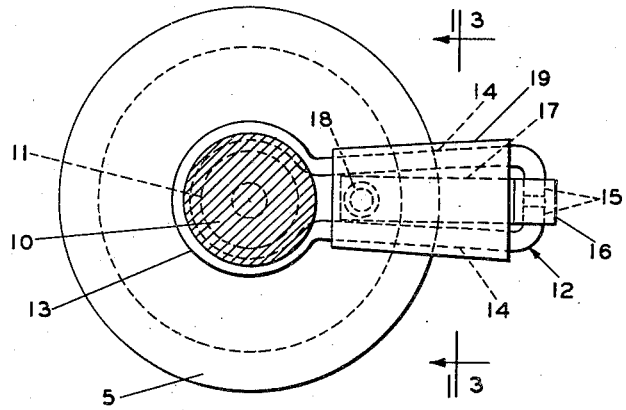
FIG. 2
INVENTOR.
C.F. SIEVERS
BY
Hudson and Young
ATTORNEYS Patented Aug. 23, 1949

2,479,785

UNITED STATES PATENT OFFICE 2,479,785

PLUG FASTENER ASSEMBLY FOR LIQUEFIED GAS CYLINDERS

Carl F. Sievers, Bartlesville, Okla., assignor to Phillips Petroleum Company, a corporation of Delaware Application April 22, 1946, Serial No. 663,775

1 Claim. (Cl. 220—30.5)

This invention relates to a plug fastener assembly particularly suited for use in conjunction with liquefied gas cylinders, especially liquefied petroleum gases such as propane or butane or a mixture of the two marketed as home and industrial fuels. In one of its specific aspects the invention relates to an assembly which prevents the possibility of detachment and loss of the plug used with liquefied petroleum gas cylinders primarily to prevent injury to the valve assembly.

The invention is particularly useful in connection with the so-called "self-service" system of using liquefied petroleum gas. Under this system, the customer buys the liquefied petroleum gas in small containers from a local dealer, transports the containers to the place where they are to be put into service, makes the necessary connections and returns the containers, when empty, to the dealer. It is essential that equipment for self-service be rugged and foolproof so that it may be easily and safely handled by persons unskilled in mechanics.

In the ordinary type of self-service system two cylinders are employed, both being connected to suitable pressure regulation and changeover equipment arranged so that only one cylinder at a time is being discharged. When one cylinder is emptied, the changeover automatically connects the other cylinder to the service line.

It has been found very desirable to provide the cylinders with an adapter which is screw-threadedly received into the top of the cylinder and is provided with a valve of the tire core type arranged to allow entry of the liquefied gas but to prevent its escape. The adapter is provided internally with screw threads which are adapted to receive either a device for filling the cylinder or a nipple which is connected to the pressure regulation and changeover equipment for discharge of the contents of the cylinder to service. It will be understood that the device received by the adapter for discharging the cylinder is provided with suitable means for opening the tire core valve. Examples of systems of this general type will be found in the patents to Thomas Nos. 2,172,311; 2,316,373; 2,329,363 and to Fritsch No. 2,340,952.

As is illustrated in Fig. 1 of the patent to Thomas No. 2,172,311, it is customary to provide a removable plug screw-threadedly received by the adapter for the purpose of protecting and preventing opening of the tire core valve with resulting escape of the liquefied gas from the cylinder during handling, storage or transportation. This plug also serves to keep out dirt, moisture or other foreign matter. It may also serve to prevent escape of the liquefied gas should the tire core valve be defective. This plug is screwed into position after the cylinder has been charged and is not removed until it is desired to place the cylinder in service whereupon it is unscrewed and means for connecting the cylinder to the service system is inserted in its place; for example a device similar to that shown in Fig. 2 of the aforesaid Patent 2,172,311 may be employed to depress the tire valve and permit escape of the contents of the cylinder to the pressure regulation and changeover equipment and thence to the service line.

As is also illustrated in Fig. 1 of Thomas Patent 2,172,311, it has heretofore been customary to provide the plug wth a ring and a bead chain which is secured to the adapter in order to prevent loss of the plug. This arrangement has not proved satisfactory. The chain has very frequently been broken in various ways and permitted the plug to become detached and lost. Also the use of a section of chain permitted the plug to dangle and interfere with the filling or discharging equipment and with the locking cover which is placed over the top of the cylinder and locked in position for the purpose of preventing unauthorized tampering with the equipment.

It is an object of the present invention to provide means for securing the plug to the cylinder which completely overcomes the foregoing objections. An object is to provide a plug fastener assembly which does not get broken. Another object is to provide such an assembly which does not permit dangling of the plug with consequent interference with the cylinder charging or discharging equipment or with the locking cover. Another object is to provide a plug fastener assembly which is simple and economical to manufacture and assemble. Another obpect is to provide such an assembly which is rugged and has a long life. Another object is to provide such an assembly which is foolproof and free from objection. Many other objects will hereinafter appear.

The accompanying drawings portray one embodiment of my invention which has been found very advantageous.

In the drawings:

Fig. 1 is a vertical section of the top of a liquefied petroleum gas cylinder equipped with an adapter and plug assembly constructed in accordance with my invention;

Fig. 2 is a view looking downwardly on the section line 2—2 of Fig. 1;

Fig. 3 is a section on the line 3—3 of Fig. 2; and

Fig. 4 is an end view of the retaining clip before it has been placed in position and closed and crimped so as to lock the assembly.

Referring to the drawings, a liquefied petroleum gas cylinder 1 of the conventional type is provided with the usual annular ring 2 having an integral shoulder 3 that is secured to cylinder 1 by weld 4. The ring 2 is internally screw-threaded to receive the self-service adapter 5 which is drilled and tapped to receive a tire core valve 6. The valve 6 has the usual upwardly projecting stem 7 which is adapted to be depressed by a suitable member carried by a member which is adapted to be screw-threadedly received inside adapter 5 in place of the plug 8 when it is desired to connect the contents of the cylinder to the service system.

The plug 8 serves to protect the valve 6 and the interior of the adapter 5 during handling, storage and transportation of the cylinder. As explained above, plug 8 is removed when it is desired to charge or discharge the cylinder 1.

Plug 8 has an outward portion 9 of relatively large diameter so designed as to be turned manually. Portion 9 may be knurled as shown to facilitate turning. If desired it may be provided with extending arms to give leverage. Plug 8 has a lower relatively small portion 10 which is provided with external screw-threads adapted to engage the internal screw-threads in adapter 5.

An annular groove 11 encircles the portion 10 outwardly of the screw-threaded portion.

A wire link 12 is provided to hold the plug 8 against detachment while allowing free rotation thereof. Link 12 has a round portion 13 which is of greater angularity than a semicircle. This portion 13 fits into the groove 11. Link 12 is preferably made of springy metal such as of brass with a spring temper. Extending outwardly from the ring portion 13 are the two portions 14 which terminate at their outward ends in two ends 15 which extend toward one another and, when the assembly has been completed, are disposed in an upstanding loop 16, forming a hinge therewith.

Loop 16 is formed in the outward end of a generally flat elongated fastener member 17 which is securely fastened at its inner end to the body of the adapter 5 by means of the drive screw 18. Instead of a drive screw any other rigidly securing means such as a threaded screw may be employed.

The assembly is locked by means of generally flat retaining clip 19 which is slipped over the two extending portions 14 of the wire link 12 and is then closed into position as by special pliers. It is preferred that the special pliers be so constructed and used as not only to close the free side 20 (Fig. 4) but also to crimp both sides, 20 and 21, of the clip 19 tightly around the wire link 12.

It will be obvious that there is sufficient lost motion between the ring portion 13 of the wire link 12 and the portion 10 of plug 8 on the one hand and between the ends 15 of link 12 and the upstanding loop 16 on the other hand to allow the plug 8 to be freely and completely screwed into and unscrewed from the adapter 5.

It will be seen that the assembly is simple, inexpensive to manufacture, easy to assemble, strong and rugged and holds plug 8 securely against detachment and loss. At the same time it allows the plug 8, when unscrewed, to be swung in a vertical plane to the right as shown in the drawing to a position in which it in no way interferes with the filling of the cylinder or placing of the cylinder in service. Dangling of the plug 8 is completely avoided.

At the same time the plug is attached to the adapter so that the entire adapter assembly may be assembled at one place and transported as a complete unit to the point where it is desired to equip the cylinders with the self-service adapter assembly whereupon it can be screwed as a unit into the ring 2 of cylinder 1. Many other advantages of my invention will be immediately apparent to those skilled in the art.

The manner of assembling the device of my invention will be obvious. The wire link 12 is first manipulated in such manner that the ring portion 13 is disposed in the groove 11 on plug 8. This is facilitated by constructing link 12 from spring wire. The hasp 17 is fastened to adapter 5 by drive screw 18. The ends 15 of link 12 are then inserted into the loop 16 of hasp 17. The clip 19 is then slipped over the generally parallel though slightly diverging portions 14 of link 12, holding the link 12 in place. The special pliers are then used to close the free side of the clip 19 and preferably to slightly crimp both sides 20 and 21 of clip 19 around the wire link.

I claim:

A device of the character described comprising, in combination, an adapter member having a threaded bore extending therethrough, a plug having a threaded portion adapted to be screwed into said bore, said plug having a portion of reduced cross-sectional area intermediate the ends thereof, and means to secure said plug to said adapter at all times comprising a link element having one end rigidly secured to said adapter and the other end bent to form a hollow cylindrical eye, a resilient wire bent to form a generally circular portion extending around said portion of reduced cross-sectional area of said plug and having generally parallel ends terminating in inturned opposed portions disposed to enter the respective ends of said cylindrical eye, and means for drawing the circular portion of said wire around the portion of reduced cross-sectional area of said plug and forcing the inturned end portions of said wire into said cylindrical eye, whereby said plug is pivotally secured to said adapter, comprising a metal sheet extending over both of the parallel ends of said wire substantially the entire distance between said plug and the eye on said link element, said sheet having two opposed edges, each edge being bent into rigid engagement with an adjacent portion of said wire and being longer than the width of the unbent portion of said sheet and thereby secured to said wire to retain said inturned end portions in said eye and to provide a rigid pivoted supporting structure extending substantially the entire distance between said plug and the eye on said link element.

CARL F. SIEVERS.

REFERENCES CITED

The following references are of record in the file of this patent:

UNITED STATES PATENTS

| Number | Name | Date |
| --- | --- | --- |
| 263,741 | Willis | Sept. 5, 1882 |
| 385,256 | Eggers | June 26, 1888 |
| 1,029,047 | Calver | June 11, 1912 |
| 1,210,599 | Clark | Jan. 2, 1917 |
| 1,313,189 | Huntoon | Aug. 12, 1919 |
| 1,572,208 | Huntoon, Jr. | Feb. 9, 1926 |
| 1,644,697 | Tornsjo | Oct. 11, 1927 |
| 2,172,311 | Thomas | Sept. 5, 1939 |